Oct. 24, 1967
R. L. PORTER
3,348,792
AIRCRAFT GUIDANCE SYSTEM
Filed Nov. 29, 1965
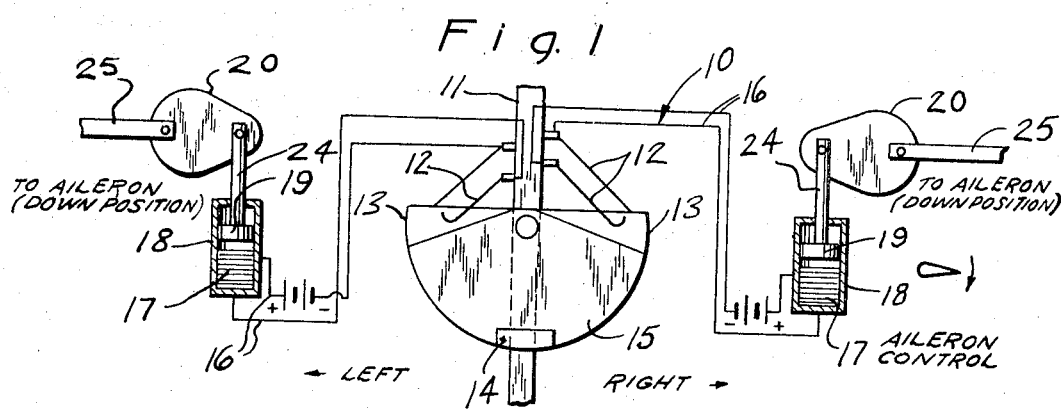
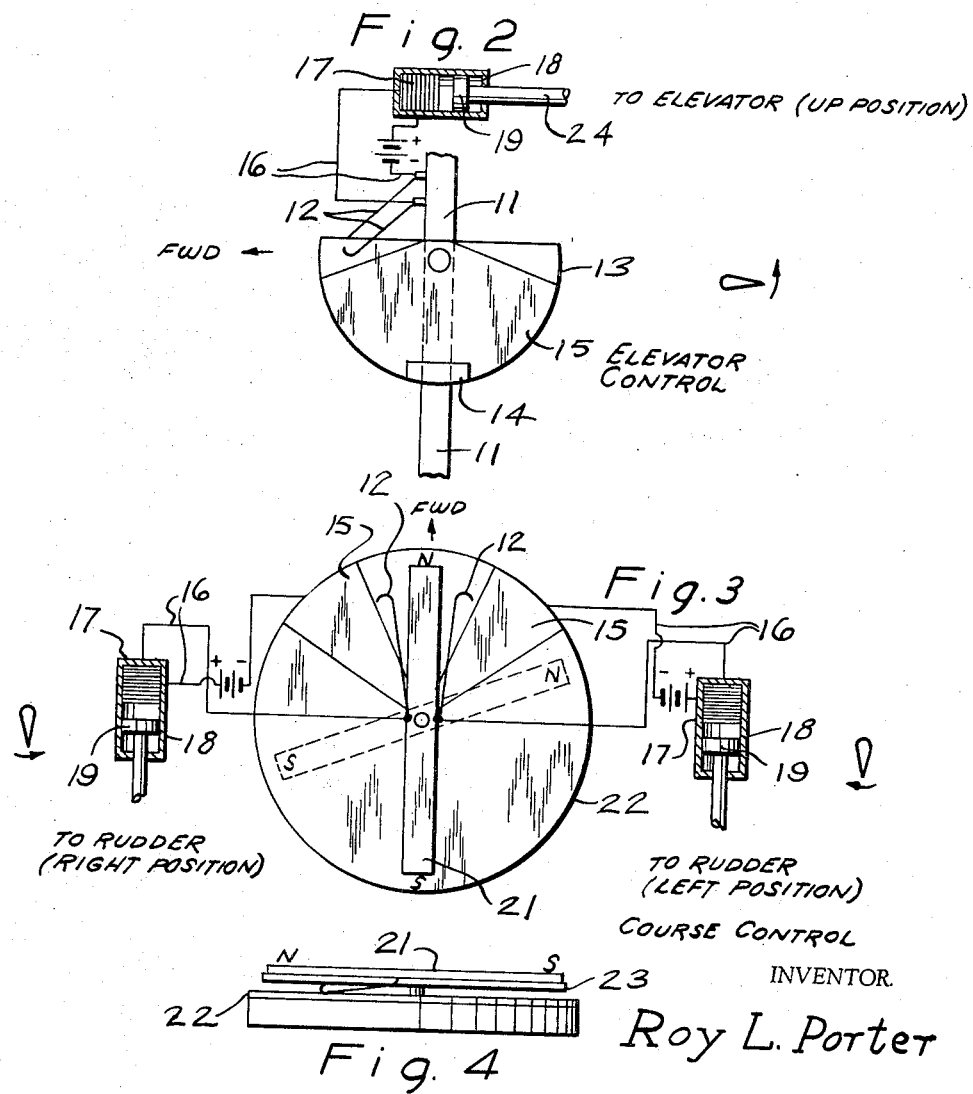
INVENTOR.
Roy L. Porter

United States Patent Office 3,348,792
Patented Oct. 24, 1967

3,348,792
AIRCRAFT GUIDANCE SYSTEM
Roy L. Porter, Groton, Conn.
(520 Big Pine Drive, Virginia Beach, Va. 23452)
Filed Nov. 29, 1965, Ser. No. 510,327
1 Claim. (Cl. 244—80)

ABSTRACT OF THE DISCLOSURE

An aircraft guidance system including a support rotatably carrying a rotary switch plate provided with a stabilization weight and interposed between a pair of electrical contacts. Departure of the aircraft from a level attitude moves the switch plate between the contacts to establish electrical communication therebetween, closing an electrical circuit and energizing an electro-magnet, which repels a permanent magnet interconnected with an aircraft control surface and thereby causes corrective movement of the surface. The system also includes a course control in which a magnetic north alignable permanent magnet swings with respect to a switch plate upon aircraft heading deviation to move an electrical contact onto an electrically conductive portion of the switch plate to complete a circuit similarly causing corrective movement of an aircraft rudder.

This invention relates to steering and controlling devices for airplanes, and more particularly to an aircraft guidance system.

It is therefore the main purpose of this invention to provide an aircraft guidance system which is adapted to automatically control the aircraft during its level flight.

Another object of this invention is to provide an aircraft guidance system for an improved course control of an aircraft.

Another object of this invention is to provide an aircraft guidance system which simultaneously affects aileron, elevator and course controls.

A still further object of this invention is to provide an aircraft guidance system which is relatively inexpensive to manufacture and provides maximum utility to the pilot of the airplane.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 1 shows a partially diagrammatic view of the invention.

FIGURE 2 shows a somewhat modified view of FIGURE 1.

FIGURE 3 shows another modification of the invention.

FIGURE 4 shows an elevational side view of the housing for permanent magnet as shown in FIGURE 3.

According to this invention, aircraft guidance system 10 is provided with an elongated mounting support 11 adapted to rotatably support rotary switch 13 which is provided with weight member 14. Two pairs of contacts 12 are secured to support 11 in such a manner that the conducting surface 15 of rotary switch 13 is interposed between the upper and lower contacts 12. The action of rotary switch 13 which is caused by attitude variations of the airplane causes conductivity of surface 15 and through contacts 12 and wires 16 energization of electromagnet 17 takes place. Since the electro-magnets 17 are disposed adjacent permanent magnets 19, with the polarity of the end of electro-magnet 17 nearest permanent magnet 19 being the same as the polarity of permanent magnet 19, permanent magnets 19 are repulsed from electro-magnets 17. Non-magnetic cylinders 18 house electro-magnets 17 and permanent magnets 19 and enable permanent magnets 19 to travel within cylinder 18. Rods 24 are secured to the center portions of permanent magnets 19. The other side of rods 24 are pivotably connected to lever arms 20 which, in turn, are connected to rods 25 thereby causing aileron (not shown) to move. Thus an upward motion of lever arm 20 causes downward motion of aileron. In order to move elevator flap of an airplane a substantially similar arrangement is shown in FIGURE 2 wherein instead of having a lever arm connected to rod 24, a direct connection is made between elevator (not shown) and rod 24. Unlike in the previously described arrangement permanent magnet 19 moves in a horizontal direction thereby causing rod 24 to move elevator upward. FIGURE 3 shows that previously described combination of electro-magnet and permanent magnet can also activate rudders of an airplane. An elongated magnet 21 is rotatably secured to center to a circular non-metallic plate and is capable of rotating in any direction as long as it aligns itself with the magnetic north. Like in the previous arrangement, surfaces 15 are actuating contacts 12 which, in turn, are connected to electro-magnets 17 since magnets 17 have like poles permanent magnets 19 are repulsed and travel in a direction opposite from magnets 17 thereby causing one rudder to assume a right position and the other rudder to assume a left position. This like housing is provided for rotatable magnet 21.

What I now claim is:

An aircraft guidance system, comprising: a support member, rotary switch means rotatably mounted on said support member, contact means mounted on said support member and being adapted to communicate with said switch means, said rotary switch means including a pair of rotary switch members and a half-circular conductor plate adapted for positioning between said contact means secured to said rotary switch members, said rotary switch means further including a weight member firmly affixed to said plate for maintaining said plate on a predetermined plane, at least one electro-magnet capable of communicating with said contact means, at least one permanent magnet adapted to be repulsed by the electric charge of said electro-magnet, a non-metallic cylindrical housing for fixedly positioning said electro-magnet and movably positioning said permanent magnet, driving means secured to said permanent magnet and being adapted to regulate control surface members of an airplane in accordance with the movements of said permanent magnet within said cylindrical housing.

References Cited

UNITED STATES PATENTS

| 1,142,218 | 6/1915 | Wood | 244—80 |
| 1,835,894 | 12/1931 | Olson | 200—61.48 |
| 2,099,808 | 11/1937 | Havill | 244—80 |

A. H. FARRELL, Primary Examiner.

MILTON BUCHLER, Examiner.